(12) United States Patent
Varenhorst

(10) Patent No.: US 9,215,242 B2
(45) Date of Patent: Dec. 15, 2015

(54) METHODS AND SYSTEMS FOR PREVENTING UNAUTHORIZED ACQUISITION OF USER INFORMATION

(71) Applicant: Dropbox, Inc., San Francisco, CA (US)

(72) Inventor: Chris Varenhorst, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 337 days.

(21) Appl. No.: 13/720,869

(22) Filed: Dec. 19, 2012

(65) Prior Publication Data

US 2014/0173726 A1    Jun. 19, 2014

(51) Int. Cl.
*H04L 29/06* (2006.01)
*H04L 29/08* (2006.01)

(52) U.S. Cl.
CPC .......... *H04L 63/1416* (2013.01); *H04L 63/101* (2013.01); *H04L 63/1483* (2013.01); *H04L 67/02* (2013.01)

(58) Field of Classification Search
CPC ............ H04L 63/1483; H04L 63/1416; H04L 63/1408; H04L 63/145; H04L 63/1441; H04L 63/101; H04L 67/02
USPC ......................................................... 726/22
See application file for complete search history.

(56) References Cited

U.S. PATENT DOCUMENTS

| 2007/0006305 A1* | 1/2007 | Florencio et al. ................ 726/22 |
| 2008/0172741 A1* | 7/2008 | Reumann et al. ................. 726/23 |
| 2010/0306845 A1* | 12/2010 | Vaithilingam et al. .......... 726/23 |

* cited by examiner

*Primary Examiner* — Kambiz Zand
*Assistant Examiner* — Benjamin Kaplan
(74) *Attorney, Agent, or Firm* — Novak Druce Connolly Bove + Quigg LLP

(57) ABSTRACT

The embodiments provide methods and systems for detecting and preventing phishing of a user's information, such as their username and password. In one embodiment, a website detects as a threshold matter whether the user has arrive at the site due to an automatic redirection from a prior visited site or by the user having clicked on a link to the website from the previous site. If this threshold is met, then the prior website is evaluated based on various criteria to determine if it appears to be a phishing site. If phishing is suspected, then the user may be notified and various other protective actions may be performed.

21 Claims, 4 Drawing Sheets

METHODS AND SYSTEMS FOR PREVENTING UNAUTHORIZED ACQUISITION OF USER INFORMATION

BACKGROUND

The present system relates to security systems and methods, and more particularly, it relates to protecting user information and accounts from phishing attacks.

Today, many users access their information or perform transactions on the Internet on various sites. Typically, users and websites employ a username and password as a security measure to protect their information. Unfortunately, criminals often attempt to obtain such information through illegal means for illicit purposes.

Phishing is a commonly employed attack aimed at acquiring a user's sensitive information, such as their username and password. Unfortunately, phishing attacks are now quite sophisticated and can appear convincingly similar to genuine communications. In one type of phishing attack, the user receives—via a website, e-mail, or instant message—a link to what appears to be an authentic website. The message typically asks the user to click on the link. When selected, the link connects the user to a website e.g., a phishing website—that masquerades as an authentic site in order to provoke the user into submitting private information, such as the user's username and password to an existing account. Often, the information can be used to access the user's account at the authentic site. Frequently, phishers target account holders of banks, online payment services, social networks, and file-sharing sites.

In a more sophisticated attack, after collecting the user's login information for a genuine site, the phishing website may automatically redirect the user to the genuine site and even log the user in using the user's illicitly obtained username and password. When a phishing site uses such techniques, it is difficult for users to detect that such an attack has occurred and that their information has been stolen.

SUMMARY

A computer-implemented method for detecting phishing attacks, according to various embodiments, may include detecting a referral from a referring website to a destination website and obtaining information from, or relating to, the referring website. The computer-implemented method may also include determining whether the referring website is a phishing site based on the obtained information and providing a warning indicating that the referring website is a phishing website.

A computer-implemented method for detecting phishing attacks, according to further embodiments, may include the steps of detecting an attempted connection to a website a user input at a client and detecting a referral from the site to a destination site based at least in part on the attempted connection. The computer-implemented method may also include providing, to a third-party site, information about the attempted connection to the site and referral. Additionally, the computer-implemented method may include determining whether the site is a phishing site based at least in part on a response received from the third-party site and providing a message indicating a phishing attack.

BRIEF DESCRIPTION OF THE DRAWINGS

Various embodiments of the invention will now be explained in further detail, and by way of example, with reference to the accompanying drawings wherein.

DETAILED DESCRIPTION

Various embodiments will now be described. It should be understood that the present systems and methods may be embodied in many different forms and should not be construed as limited to the embodiments set forth herein. Like numbers refer to like elements throughout.

System Overview

Various embodiments provide methods and systems for detecting and preventing phishing of a user's information, such as their username and password. In one embodiment, a webpage may first determine whether a user has been automatically redirected from another website to the present website after selecting a link on a prior visited site. In various embodiments, the webpage may do this by checking a HTTP Referrer field in the request received from the user's web browser to determine whether the HTTP Referrer field is populated. If the HTTP Referrer field is populated, the web page may assume that the user has been either automatically redirected from another site or has been led to the present site after selecting a link on a prior-visited site.

If such redirection or referral has occurred, the activity could be simply innocent (i.e., the user clicked a link to the present site from another legitimate site that references the present site), or it may be part of a sophisticated phishing attack. To determine if a phishing attack has occurred, the present webpage may evaluate the previous webpage using one or more criteria, alone or in combination, that may be suggestive of a phishing attack. For example, the system may determine that a phishing attack is likely to have occurred if, for example: (1) the URL for the prior webpage is similar to the URL of the present webpage; (2) the prior webpage includes text that is similar to text on the present webpage; (3) the prior webpage includes graphics that are similar to those on the present webpage; or (4) the prior webpage includes graphics that contain watermarks that are similar to those included within graphics on the present webpage.

Certain embodiments of the invention will now be described in greater detail. These embodiments are presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the principles of the invention and scope of the claims. To illustrate some of the embodiments, reference will now be made to the figures.

Exemplary Operating Environment

Figure 1:
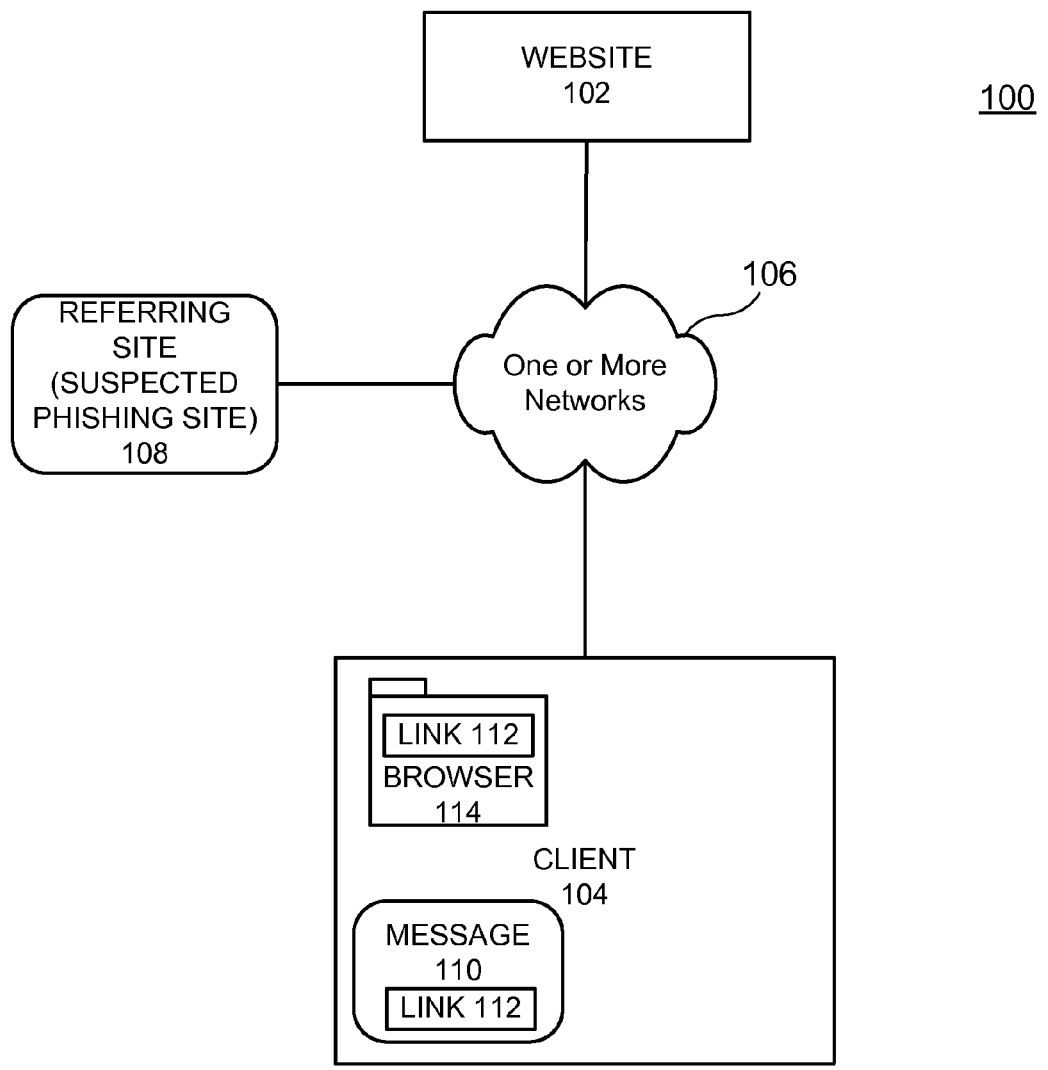
FIG. 1 shows an exemplary operating environment for an exemplary method that a system associated with an authentic webpage may use to detect whether a user has been improperly diverted to the webpage by a phishing program.

FIG. 1 shows exemplary operating environment 100 for an exemplary method that an authentic webpage may use to detect whether a user has been improperly diverted to the webpage by a phishing program. As shown, environment 100 may include website 102 and one or more clients 104 that are connected via one or more networks 106. For purposes of illustration, FIG. 1 shows one website 102 and one client 104. However, one skilled in the art will recognize that environment 100 may include any number of clients and servers. In addition, FIG. 1 illustrates web browser 114, present (authentic) website 102 that the web browser may be visiting, and prior website 108 that browser 114 visited immediately before visiting authentic website 102. Authentic website 102 may provide services accessible by client 104. In such cases, the user associated with client 104 may possess an account with authentic website 102 that is protected, for example, using a username or login and password. In the course of providing services to client 104, website 102 may also collect other information from the user associated with client 104.

Website 102 may be implemented with any known server platforms (such as those provided by Intel Corporation, Dell Inc., etc.) and may interact over a network using known protocols, such as TCP/IP, HTTP, and SSL. An exemplary server platform may include one or more processors (not shown) connected to a cache to serve as a working memory. An exemplary server may also be a part of a cross-platform synchronization and sharing service (e.g., the Dropbox™ Service). Commands and data from the processor may be communicated over a communication bus. In addition, the servers that host website 102 may include memory (not shown), such as Random Access Memory (RAM), where the operating system and applications implementing the methods of the present embodiments may be executed during runtime. Website 102 may further include or connect to storage, for example, a hard disk drive and/or storage array. Website 102 may also include one or more network interfaces to send and receive data via network 106, for example, with client 104.

In one embodiment, website 102 may be configured as a website that is accessible via the Internet. In this disclosure, website 102 is the true or authentic website with which the user associated with client 104 has an account.

Client 104 may provide a hardware and software platform for executing various applications, such as a web browser, that are utilized by a user. Client 104 may be implemented with known hardware and software, such as personal computers, laptops, tablets, smart phones, and the like. Client 104 may use operating systems such as Linux®, Windows®, Macintosh®, or other available operating systems.

Client 104 may include one or more processors (not shown) to execute the software and applications. Client 104 may further include a memory, such as a RAM and may include storage, such as a hard disk drive, optical disk, solid state drive, and the like. Client 104 may also include various user interface devices (not shown), such as a keyboard, a mouse, a display, a touch screen, and the like for allowing a user to interface with client 104 and website 102. In addition, client 104 may include a network interface, such as a wired or wireless interface, to send and receive data with one or more networks 106.

One or more networks 106 may be any type of network, such as the Internet, a Wide Area Network (WAN), or a Local Area Network (LAN). Although FIG. 1 graphically shows a single network, those skilled in the relevant field will recognize that the network may include multiple networks.

Figure 1A:
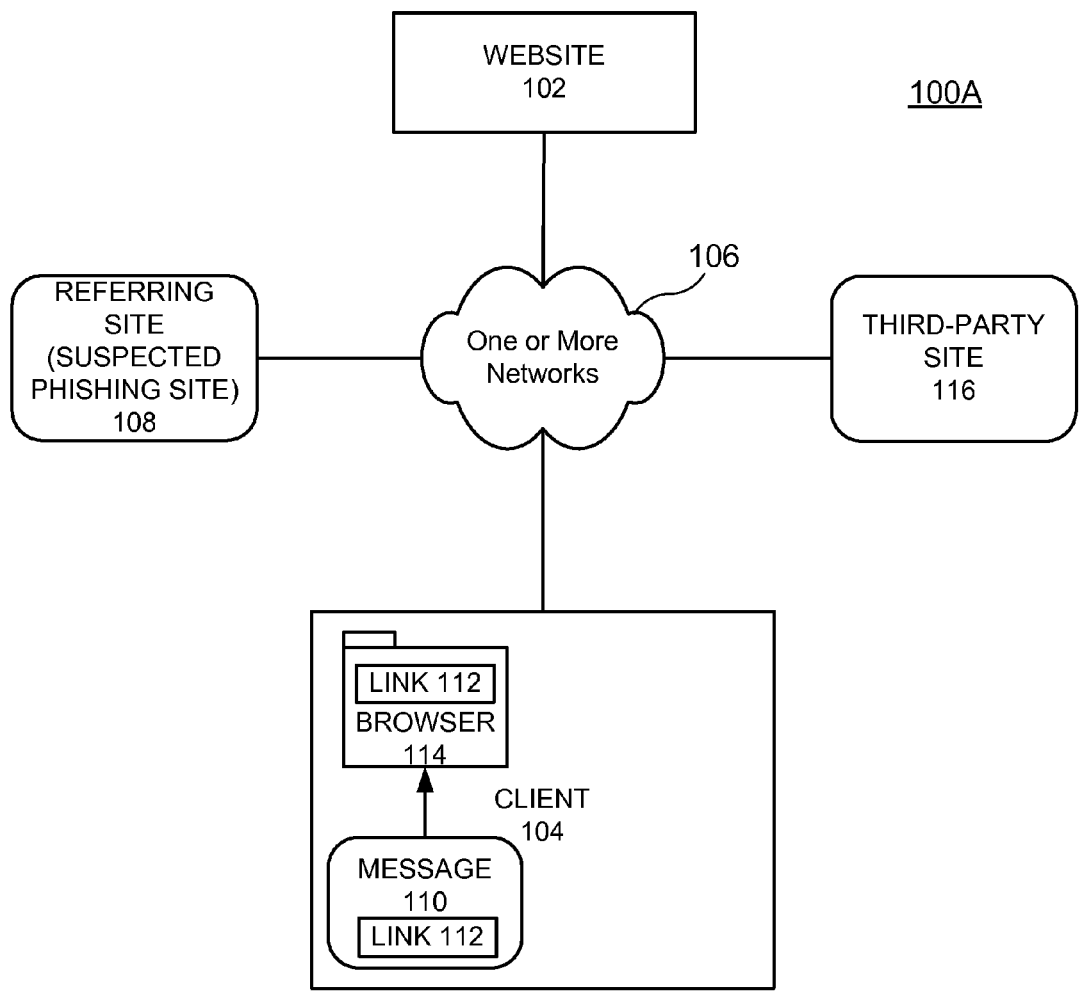
FIG. 1A shows an exemplary operating environment for exemplary methods that a browser or third party service may use to detect whether a user of a browser has been subject to a phishing attack.

FIG. 1A shows another exemplary operating environment 100A for a system for phishing detection in which a third-party site may intercept a user-accessed link to a referring site (e.g., before the user's browser is directed to the referring site) and may determine whether the referring site is a phishing site before the user accesses the referring site. As shown, environment 100A is similar to environment 100 in FIG. 1 and further includes third-party site 116. In various embodiments, the system may be configured so that third-party site 116 intercepts an attempt by a user to access referring site 108 via browser 114.

Figure 2:
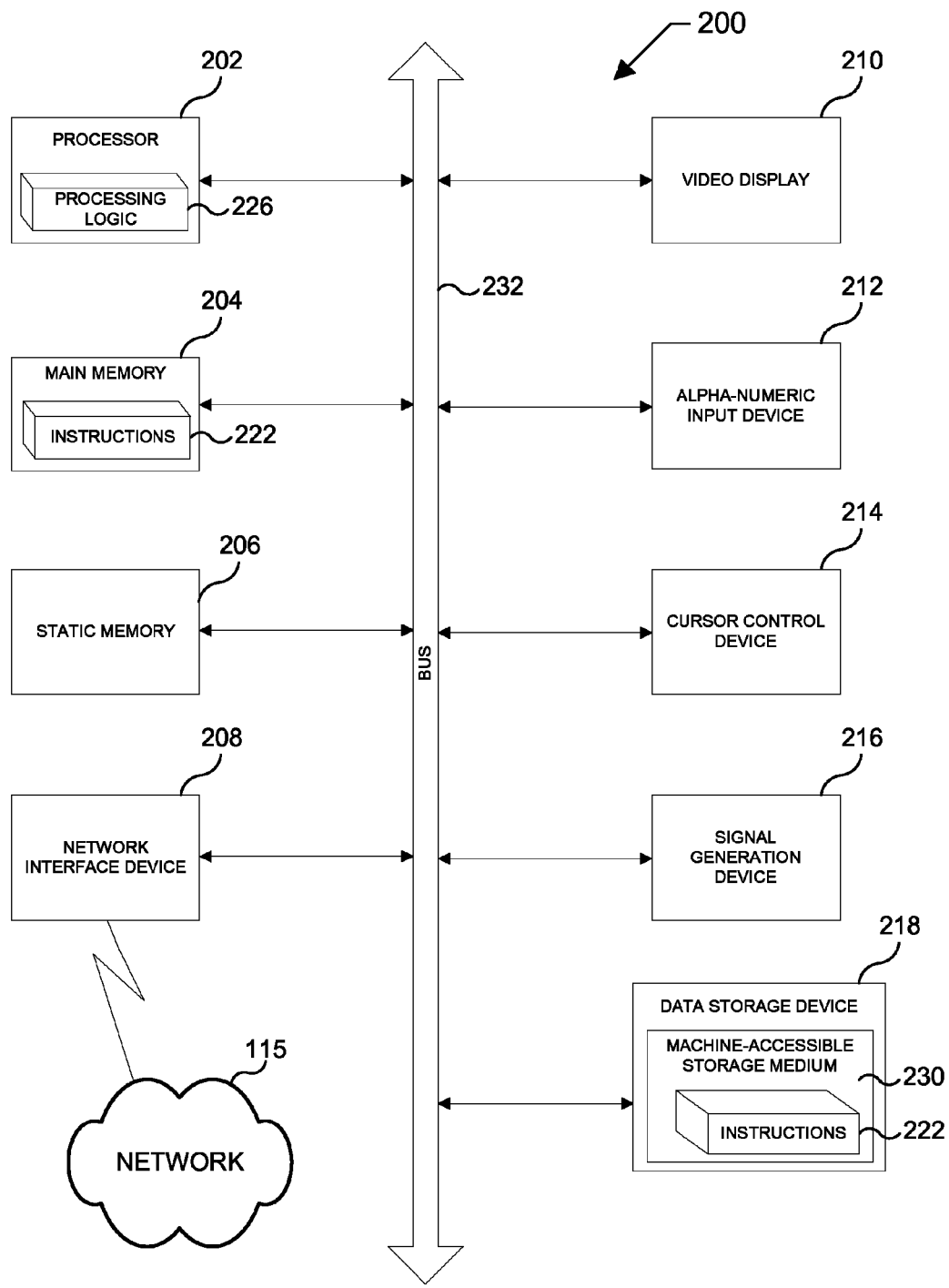
FIG. 2 shows a block diagram of a computer that is suitable for use within various embodiments of the invention.

FIG. 2 illustrates a diagrammatic representation of computer 200 that can be used within environment 100 or 100A, for example, as client 104 (FIG. 1). For purposes of this disclosure, reference to a server or processor, shall be interpreted to include either a single server, a single processor, or multiple servers, or multiple processors.

In particular embodiments, computer 200 may be connected (e.g., networked) to other computers by a WAN, LAN, an intranet, an extranet, and/or the Internet. Computer 200 may operate in the capacity of a server or a client computer in a client-server network environment, or as a peer computer in a peer-to-peer (or distributed) network environment. Computer 200 may be a personal computer (PC), a tablet PC, a mobile device, a web appliance, a server, a network router, a switch or bridge, or any computer capable of executing a set of instructions (sequential or otherwise) that specify actions to be taken by that computer. Further, while only a single computer is illustrated, the term "computer" may also include any collection of computers that individually or jointly execute a set (or multiple sets) of instructions to perform any one or more of the methodologies discussed herein.

Exemplary computer 200 may include processor 202, main memory 204 (e.g., read-only memory (ROM), flash memory, dynamic random access memory (DRAM) such as synchronous DRAM (SDRAM) or Rambus DRAM (RDRAM), etc.), static memory 206 (e.g., flash memory, static random access memory (SRAM), etc.), and data storage device 218, which communicate with each other via bus 232.

Processor 202 may represent one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 202 may also be one or more special-purpose processing devices such as an application specific integrated circuit (ASIC), a field programmable gate array (FPGA), a digital signal processor (DSP), a network processor, or the like. Processor 202 may be configured to execute processing logic 226 for performing various operations and steps discussed herein.

Computer 200 may further include a network interface device 208. Computer 200 also may include video display 210 (e.g., a liquid crystal display (LCD) or a cathode ray tube (CRT)), alpha-numeric input device 212 (e.g., a keyboard), cursor control device 214 (e.g., a mouse), and signal generation device 216 (e.g., a speaker).

Data storage device 218 may include machine accessible storage medium 230 (also known as a non-transitory computer-accessible storage medium, a non-transitory computer-readable storage medium, or a non-transitory computer-readable medium) on which is stored one or more sets of instructions (e.g., a module configured to carry out the steps illustrated in FIG. 3) embodying any one or more of the methodologies or functions described herein. The FIG. 3 module may also reside, completely or at least partially, within main memory 204 and/or within processing device 202 during execution thereof by computer 200, main memory 204, and processing device 202 also constituting computer-accessible storage media. Instructions 222 (e.g., the module shown in FIG. 3) may further be transmitted or received over network 220 via network interface device 208.

While machine-accessible storage medium 230 is shown in an exemplary embodiment to be a single medium, the term "machine-accessible storage medium" should be understood to include a single medium or multiple media (e.g., a centralized or distributed database, and/or associated caches and servers) that store the one or more sets of instructions. The term "machine-accessible storage medium" shall also be understood to include any medium that is capable of storing, encoding, or carrying a set of instructions for execution by the computer and that cause the computer to perform any one or more of the methodologies of the present invention. The term "computer-accessible storage medium" shall accordingly be understood to include, but not be limited to, solid-state memories, optical, and magnetic media.

Operation of Exemplary Embodiment

Figure 3:
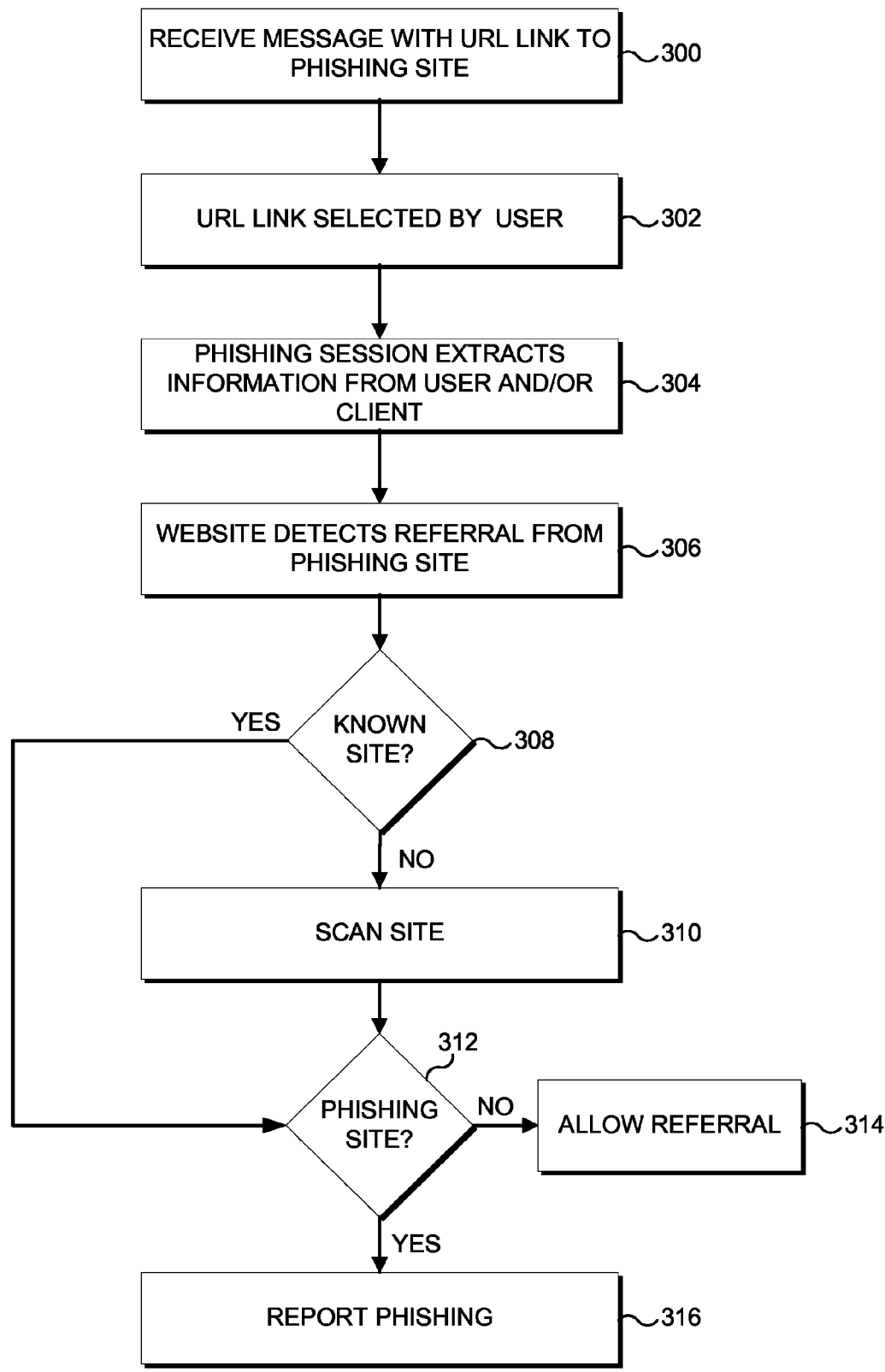
FIG. 3 shows an exemplary process flow for a phishing prevention process according to a particular embodiment.

FIG. 3 may illustrate the operation of a phishing prevention method according to a particular embodiment.

In step 300, the user at client 104 may receive message 110 (see FIG. 1). Message 110 may be, for example, any communication, such as an email, containing link 112, that attempts to induce the user to visit referring site 108 (e.g., by accessing link 112). The message may include various text and graphics that make referring site 108 appear genuine and/or related to authentic website 102.

In step 302, the user may select link 112 provided in message 110. In response, browser 114, running on client 104, may be directed to referring site 108.

In step 304, referring site 108 may commence a phishing session to collect and/or extract information from the user and/or client 104. To disguise its purpose, as noted above, referring site 108 may display various graphics and text that mimic legitimate website 102, or otherwise attempt to appear to be authentic website 102 or related to authentic web site 102. In addition, referring site 108 may utilize a URL that incorporates the same or similar name as website 102. For example, if website 102 has a URL such as www.company.com, then a phishing site may use a URL of www.my-company.com or www.company.abc.com. As another example, a phishing site may utilize a homonym or other type of subtle misspelling of a legitimate URL, such as www.com-pany.com, i.e., to mimic www.company.com.

As a phishing website, website 108 may prompt the user to provide or enter their sensitive information, such as their username and password for an account maintained at legitimate website 102. Referring site 108 may also attempt to install malicious code, such as key-logging software, or a virus, on client 104.

Then, website 108 may attempt to conceal the phishing session by automatically redirecting browser 114 to corresponding authentic website 102. For example, referring site 108 may attempt to redirect browser 114 to a webpage, such as a login page, on legitimate website 102 and, perhaps, automatically log the user in at legitimate website 102 with the user's stolen information. Such redirects may employ well-known TCP/IP and HTTP communications.

At step 306, legitimate website 102 may monitor and detect referrals or redirects, such as from phishing site 108, in an attempt to detect such phishing attacks. For example, in one embodiment, website 102 may read and log information provided in the referrer field within the HTTP communication. In HTTP communications, the referrer field indicates the last visited site if the user either (1) was redirected to the present site from the previous site, or (2) clicked a link on the previous site that led to the present site. Thus, legitimate website 102 can detect and identify referring site 108 and take steps to determine whether referring site 108 is likely a phishing site.

In step 308, as a preliminary check, website 102 may make an initial determination as to whether referring site 108 matches a known website (such as reflected in blacklists or whitelists). If referring site 108 is on a list of blacklisted phishing sites, it may be a known phishing site. If it is on a whitelist, referring site 108 may be a known authentic site (e.g., Facebook). If referring site 108 is a known site, then processing flows to step 312, where the system determines which list it was on. At that point, if referring site 108 is on a whitelist, then the system may assume that no phishing attack occurred, and the process flows to step 314. If the referring site was on a blacklist, processing flows to step 316, and corrective action may be taken. Steps 314 and 316 are further described below.

Scan to Detect Potential Phishing

If prior site 108 was not known (because it was not on either a whitelist or blacklist) in step 308, then step 310 may be performed. In step 310, website 102 (or servers acting on its behalf) may perform a scan of referring site 108 or information about referral from site 108 using one or more of a variety of analyses described below, alone or in combination, and in any progression, to determine whether it is likely that site 108 is a phishing site.

1—Determining Potential Phishing Based on URL of Referring Site

As an initial analysis, website 102 may analyze the URL of referring site 108. If the URL from referring site 108 is similar to URLs used by legitimate website 102 (or its related sites), then this may be suggestive of website 108 being a phishing site. For example, similarities may include, for example; (1) one or more portions of the URL for the previous website 102 matching portions of the URL to the legitimate website; (2) subtle misspellings in the website 108's URL relative to the URL of site 102 (such as donain.com for domain.com or evvample.com for example.com) and the use of homonyms in the URL of site 108 relative to site 102.

2—Determining Potential Phishing Based on Nature of Destination Webpage

Website 102 may also detect phishing based on a referral by site 108 to a page of website 102 that is usually not the first page of legitimate website 102 that is accessed by visitors. For example, legitimate website 102 may host the login page for a user on a separate page that is usually not the first page of the site accessed by client 104. Accordingly, a redirection to such a login page (or even a redirection from website 108 directly to a page of website 102 that users typically see only after logging into site 102) may be indicative that website 108 is a phishing site.

3—Determining Potential Phishing Based on History or Location of Referring Site

Legitimate website 102 may also detect potential phishing based on the history of the referring site, or on a geographical location associated with referring site 108. For example, in a particular embodiment, website 102 may be configured to perform a domain name service (DNS) lookup of the referring site's URL to determine the history of referring site 108. If the URL was only recently registered or is assigned to an unusual entity, then website 102 may use this as an indicator that referring site 108 may be a phishing site. Website 102 may also determine if referring site 108 has an IP address associated with a geography known for originating phishing or spam attacks, which may be indicative that website 108 is a phishing site.

4—Determining Potential Phishing Based on Similarity of Images from Referring Site to those Associated with the Destination Site Legitimate website 102 may also detect potential phishing by determining whether images on referring website 108 are similar to images on legitimate website 102. When using this technique, legitimate website 102 (or one or more servers acting on its behalf) may scan and compare images used by referring site 108 with its own images. To perform the comparison, legitimate website 102 may employ hashing techniques, such as MD5, SHA-256, and so on, to determining whether images on referring site 108 are the same as images on legitimate website 102. For example, if the images have the same hash value, they are likely to be the same. In particular embodiments, the system may calculate and store a hash value for each image on the legitimate site, and then later retrieve the stored hash values for use in determining whether the images are the same as those stored on referring site 108. This approach may be more efficient than re-calculating the hash values of the images on the legitimate site each time a comparison between images is made.

Website 102 may also perform other comparison techniques to determine if the images from referring site 108 are copies of images on legitimate website 102. Such techniques may include, for example, size checking, content encoding, analysis of image file metadata, and so on. Website 102 may consider the use of copied images by referring site 108 as an indicator of suspicious activity or a phishing attack.

5—Determining Potential Phishing Based on the Presence of Certain Digital Signatures or Watermarks on Referring Site Legitimate website 102 may also detect potential phishing by determining whether certain digital signatures or watermarks exist on both the referring site and the authentic site (which would indicate that certain portions of legitimate website 102 have been copied into referring site 108). For example, legitimate website 102 may initiate a scan of the contents of the referring site 108 and retrieve the images used on referring site 108. Website 102 may then search within these images for distinctive features, such as a numerical code, a watermark, or digital signature that are included in one or more images on legitimate website 102. In one embodiment, legitimate website 102 may watermark images used on its various pages to detect if and when an image has been copied.

6—Determining Potential Phishing Based on Similarity of Programming Code on Referring Site to Code on Destination Site Legitimate website 102 may further detect potential phishing by determining whether programming code on referring website 108 is similar to programming code on legitimate website 102. When using this technique, website 102 scans the potentially phishing site and analyzes its program code, such as its HTML code. In particular, website 102 may identify referring site 108 as a phishing site if it uses copied program code or other resources from website 102 or its related websites.

7—Determining Potential Phishing Based on Behavior of Referring Site

Website 102 may also be configured to keep a list of sites that appear to have accessed website 102 in an attempt to catalog the site. Website 102 may later determine that it needs to investigate such a site as a result of a referral.

8—Determining Potential Phishing Based on Similarities between Text on Referring Site and Text on Authentic Site In this technique, website 102 (or one or more servers acting on its behalf) may scan referring site 108 and analyze its text for similarities that are considered suspicious. For example, website 102 may check if referring site 108 is using distinctive text, such as company slogans, product names, etc., within its text. Such mimicking of this text may indicate that referring site 108 is suspicious and a likely phishing site.

Completion of Analysis

As noted, website 102 (or one or more servers acting on its behalf) may employ the foregoing techniques alone or in combination and in any order to determine if referring website 108 is likely to be a phishing site. Based on this information, in step 312, website 102 may determine if website 108 is likely to be a phishing site.

If website 102 determines in step 312 that referring site 108 is not a phishing site, then website 102 may then service and respond to the referral accordingly in step 314. Website 102 may also add an entry to its whitelist if it is maintaining one.

But if website 102 determines, in step 312, that referring site 108 is likely a phishing site, then, at step 316, website 102 may perform one or more actions, such as the following: (1) support personnel associated with website 102 may conduct further manual investigation; (2) website 102 may send a warning message (email, instant message, or the like) back to client 104 to alert the user of the potential phishing attack and/or warn the user to take corrective action such as changing their username and password; (3) website 102 may report the phishing attack to support personnel of website 102, law enforcement agencies, domain name services, third party legal enforcement personnel, Internet service providers, and the like; (4) website 102 may add website 108 to its blacklist if it is maintaining one.

Phishing Prevention by Third-Party Site

Although the concepts described above are described as being performed by a destination website, in other embodiments, similar techniques may be implemented by a third-party site. FIG. 1A shows an operating environment 100A for such an implementation.

In various embodiments, user's browser 114 may be configured so that, each time that it is referred to new website 102, browser 114 sends the URL of new website 102, along with the URL of referring website 108, to third-party site 116. Third-party site 116 may then apply the techniques above to identify suspected phishing events and to inform any interested parties of the suspected phishing activity. In other embodiments, this process may be performed by user's browser 114, rather than a third-party website. In particular embodiments, if the browser or third-party website identifies suspected phishing activity, the browser or third-party website may prevent the attempted connection to new website 102.

CONCLUSION

Many modifications and other embodiments of the invention will come to mind to one skilled in the art to which this invention pertains having the benefit of the teachings presented in the foregoing descriptions and the associated drawings. For example, as will be understood by one skilled in the relevant field in light of this disclosure, the invention may take form in a variety of different mechanical and operational configurations. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

I claim:

1. A computer-implemented method for detecting a phishing attack by a referring website, the method comprising:
   identifying a referral from a referring site to a destination site, where the referral is listed in a referrer field within a HyperText Transfer Protocol (HTTP) communication;
   obtaining information from, or relating to, the identified referring site;
   determining whether the referring site is a phishing site based on the obtained information; and
   providing a warning indicating that the referring site is a phishing site when it has been determined that the referring site is a phishing site,
   wherein the step of obtaining information from, or relating to, the referring site is performed by at least one server associated with the destination site.

2. The method of claim 1, wherein the at least one server associated with the destination site is part of a synchronized content management system.

3. The method of claim 1, wherein the information comprises the referring site's uniform resource locator link.

4. The method of claim 1, wherein determining whether the referring site is a phishing site comprises identifying similarities between text of the referring site's uniform resource locator and a known set of text used in at least one uniform resource locator associated with the destination site.

5. The method of claim 1, wherein:
   the information comprises text from the referring site; and
   the step of using the information to determine whether the referring site is a phishing site comprises:
      comparing text from the referring site with text from the destination site; and
      in response to determining that the text of the referring site and the text of the destination site are at least substantially similar, determining that the referring site is a phishing site.

6. The method of claim 5, wherein the step of determining whether the at least one image is at least substantially similar to an image displayed on the destination site comprises:
   identifying a first watermark within the at least one image;
   comparing the first watermark to a second watermark used within an image on the destination site; and
   in response to determining that the first watermark at least substantially matches the second watermark, determining that the referring site is a phishing site.

7. The method of claim 5 wherein the step of determining whether the at least one image is at least substantially similar to an image displayed on the destination site comprises:
   determining a first hash of the at least one image;
   comparing the first hash to a second hash of the image displayed on the destination site; and
   in response to determining that the first hash at least substantially matches the second hash, determining that the site is a phishing site.

8. The method of claim 1, wherein:
   the step of obtaining information from, or relating to, the referring site comprises obtaining at least one image displayed on the referring site; and
   the step of using the information to determine whether the referring site is a phishing site comprises:
      determining whether the at least one image is at least substantially similar to an image displayed on the destination site; and
      in response to determining that the at least one image is at least substantially similar to an image displayed on the destination site, determining that the referring site is a phishing site.

9. The method of claim 1, wherein determining whether the referring site is a phishing site comprises:
   comparing a uniform resource locator of the referring site to a list of uniform resource locators of known phishing sites; and
   in response to the uniform resource locator of the referring site matching at least one of the uniform resource locators of known phishing sites, determining that the referring site is a phishing site.

10. The method of claim 1, wherein determining whether the referring site is a phishing site comprises:
    comparing a uniform resource locator of the referring site to a list of uniform resource locators of known safe sites; and
    in response to the uniform resource locator of the referring site matching at least one of the uniform resource locators of known safe sites, determining that the referring site is not a phishing site.

11. The method of claim 1, wherein determining whether the referring site is a phishing site comprises determining that the referral is to a page of the destination site that is not typically a first page on the destination site visited by browsers.

12. A non-transitory computer readable medium storing computer-executable instructions for:
    identifying a referral from a referring site to a destination site, where the referral is listed in a referrer field within a HyperText Transfer Protocol (HTTP) communication;
    obtaining information from, or relating to, the identified referring site;
    using the obtained information to determine whether the referring site is a phishing site; and
    providing a warning indicating that the destination site is a phishing site when it has been determined that the referring site is a phishing site,
    wherein the step of obtaining information from, or relating to, the referring site is performed by at least one server associated with the destination site.

13. A system for detecting a phishing attack by a referring website, the system comprising one or more processors, wherein the system is configured to:
    identify a referral from a referring site to a destination site, where the referral is listed in a referrer field within a HyperText Transfer Protocol (HTTP) communication,
    obtain information from, or relating to, the identified referring site, obtaining information from, or relating to, the identified referring site,
    use the obtained information to determine whether the referring site is a phishing site, and
    provide a warning indicating that the destination site is a phishing site when it has been determined that the referring site is a phishing site,
    wherein the step of obtaining information from, or relating to, the referring site is performed by at least one server associated with the destination site.

14. The system of claim 13, wherein the system is a synchronized content management system.

15. A computer-implemented method for detecting a phishing attack, the method comprising:
    detecting, by a processor, an attempted connection to a site in response to a user input at a client;
    detecting, by a processor, a referral from the site to a destination site based at least in part on the attempted connection, where the referral is listed in a referrer field within a HyperText Transfer Protocol (HTTP) communication;

providing, by a processor to a third-party site, information about the attempted connection to the site and referral;

determining, by a processor, whether the site is a phishing site based at least in part on a response received from the third-party site; and providing, by a processor, a message indicating a phishing attack at least when it has been determined that the referring site is a phishing site.

16. The method of claim 15, wherein detecting the attempted connection to the site comprises detecting, by a browser running on the client, a user selection of a uniform resource locator link.

17. The method of claim 15, wherein detecting the attempted connection to the site comprises detecting the attempted connection to the site by a plug-in within a browser running on the client.

18. The method of claim 15, wherein providing the information about the referral to the third-party site comprises providing text from a uniform resource locator link selected by a user in a message received by the client.

19. The method of claim 15, further comprising preventing the attempted connection to the site in response to determining that the site is a phishing site.

20. The method of claim 15, further comprising allowing the attempted connection to the site in response to determining that the site is not a phishing site.

21. The method of claim 15, further comprising sending a notice to another entity in response to determining that the site is a phishing site.

* * * * *